United States Patent [19]
Gigliotti

[11] Patent Number: 4,640,018
[45] Date of Patent: Feb. 3, 1987

[54] CHECKBOOK RECORDING DEVICE

[76] Inventor: Fred Gigliotti, 42 Meadow Dr., Greensburg, Pa. 15601

[21] Appl. No.: 822,399

[22] Filed: Jan. 24, 1986

[51] Int. Cl.[4] .................... G01B 3/00
[52] U.S. Cl. .................... 33/562; 33/443
[58] Field of Search .................... 33/562, 412, 448, 443, 33/446, 563, 566; 283/57

[56] References Cited

U.S. PATENT DOCUMENTS

| | | | |
|---|---|---|---|
| 241,801 | 5/1881 | Hagan | 33/443 |
| 2,167,131 | 7/1939 | Weidenborner | 33/443 |
| 2,171,605 | 9/1939 | Sherman | 33/443 |
| 2,230,927 | 2/1941 | Bowman et al. | 33/443 |
| 2,307,358 | 1/1943 | Cloud | 33/563 |
| 3,290,061 | 3/1965 | Glassman | 282/23 R |
| 3,435,543 | 4/1965 | Slemmons | 35/61 |
| 3,557,463 | 5/1968 | Perry et al. | 33/562 |
| 3,620,553 | 12/1968 | Donovan | 283/17 |
| 3,893,243 | 4/1972 | Schuller | 33/562 |
| 4,262,422 | 4/1981 | Pass | 33/1 B |

*Primary Examiner*—Willis Little
*Attorney, Agent, or Firm*—H. Keith Hauger

[57] ABSTRACT

A checkbook using conventional, standard bank checks and preprinted record keeping sheets in booklet form where the data written on the check is simultaneously transferred onto one of the preprinted recording sheets. A first template, insertable in an inner pocket, has opposed outer guides for receiving slides of a cooperating second template, which cooperating second template has an elongated window and is movable along the guides of the first template for positioning its window in registry with a blank transaction line on the preprinted sheet, whereby upon the placement of a check over the cooperating second template and the writing of the check, data is simultaneously transferred onto the preprinted sheet.

11 Claims, 5 Drawing Figures

CHECKBOOK RECORDING DEVICE

BACKGROUND OF THE INVENTION

1. Field of the Invention

The invention relates to a conventional checkbook used by individuals or businesses for issuing negotiable checks provided by financial institutions where the checking account is held, and keeping a record of such transactions. In particular, a device is used to bring into registry an available blank space on a record register in order to simultaneously transfer some or all of the written data of each check in the record register for easy recording and balancing of the account.

2. Description of the Prior Art

Organizations, such as banks and/or savings and loan associations, usually provide a supply of specially printed checks to their checking account customers. These checks are normally in pads of about 25 single checks. A register containing a record of items for the transactions is also provided along with a checkbook folder which retains the unused checks and the transaction register record. In checkbooks of this type, the check pad is retained on one side of the folder, and the register record, normally in booklet form, is retained on the other side thereof, where the data for each issued check is entered on the record register separately by the checkbook user prior to or after a check has been written for record keeping purposes. This procedure for keeping track of the monies going out of the checking account lends itself to duplication of data recording which may result in omissions and errors since the information for balancing of the account has to be written twice; once on the face of the check; and once on the record register.

Several checkbook and/or record keeping devices have evolved. One attempt is disclosed in U.S. Pat. No. 3,290,061. This device is for writing a negotiable instrument, such as a check, with several identical non-negotiable slips which are distributed as desired to the interested parties. These duplicate data slips contain either a carbon sheet therebetween or each slip is coated with a reproducing media so that the data written on the top slip is transferred to the remaining copies of slips. Each slip is similar in format in that they each contain a columnar area on the left hand side for recording the charges, and a middle section with indicia lines for filling in such information as the date, the payee, the amount, and the signature of the payer. A cut-out section for the signature for the negotiable slip appears on the topmost slip of the packet for signature verification purposes. This device is mainly employed by a group of individuals, belonging to an association or organization.

Another attempt for writing a check and having the pertinent information automatically transferred onto a register record without the need for writing the information twice appears in U.S. Pat. No. 3,620,553. Disclosed herein is a devise for holding a stack of checks on one side of the folder and a pad of record forms on the other side of the folder. The record forms may be made of a self-marking pressure sensitive duplicating paper which is folded over to be inserted beneath a negotiable check so that the printed information is transferred onto the record form.

In both these above mentioned patents, a transaction involving the writing of a check is transferred onto a form greatly resembling the face of the check. Since this is the case, at the present time no means are provided which pre-registers an empty space on a record register form of the type containing several lines for the several transactions, which preprinted forms in booklet form are commonly provided for the use of the individual or business by the financial institutions servicing checking accounts.

In spite of the foregoing disclosures, therefore, there remains a need for an improved device for registering a transaction occurring in the form of check writing onto a preprinted form at the same time the check is being written, which preprinted forms provide for the recording of several such transactions on a single sheet instead of a stub or facsimile for each transaction which must be diligently kept in one's files.

SUMMARY OF THE INVENTION

The present invention has met the above described need. In one of the preferred embodiments a registering device for a checkbook comprises a template slideable along guides where one of the preprinted record sheets is inserted beneath the slideable plate, having a window whose opening extends across an area for recording the written information. A check is placed on top of the slideable plate with the payee and the amount lines of the check positioned directly over the window. Either through the employment of pressure sensitive, self-marking preprinted record sheets, or a carbon leaf, this information is transferred onto the record sheet beneath the slideable plate in the area outlined by the window. Several transactions can be consecutively entered on this record sheet, which contains several entry lines, simply by sliding the template down to the next blank space on the record sheet and placing the check directly over the template such that the data which is to be transferred upon the writing of the check is in registry with the window area.

It is an object of the present invention to provide a registering mechanism for recording several transactions on a single sheet of a record register by economical and efficient means.

It is another object of the present invention to provide such a registering mechanism which is easily adaptable to existing checkbook folders.

A further object of the present invention is to provide a checkbook device which can easily transfer several transactions in one compact area for easy record keeping and balancing of an account.

These and other objects of the present invention will be more fully appreciated and understood when the following description is read along with the drawings which are as follows:

DETAILED DESCRIPTION OF THE PREFERRED EMBODIMENTS

Some of the pertinent facts regarding the writing of a check and a need for automatically recording and transferring data onto a secondary source for its retention for record keeping purposes is found in the above '553 patent, which is incorporated herein by reference mainly to give a better explanation of the background of the present invention.

Figure 1:
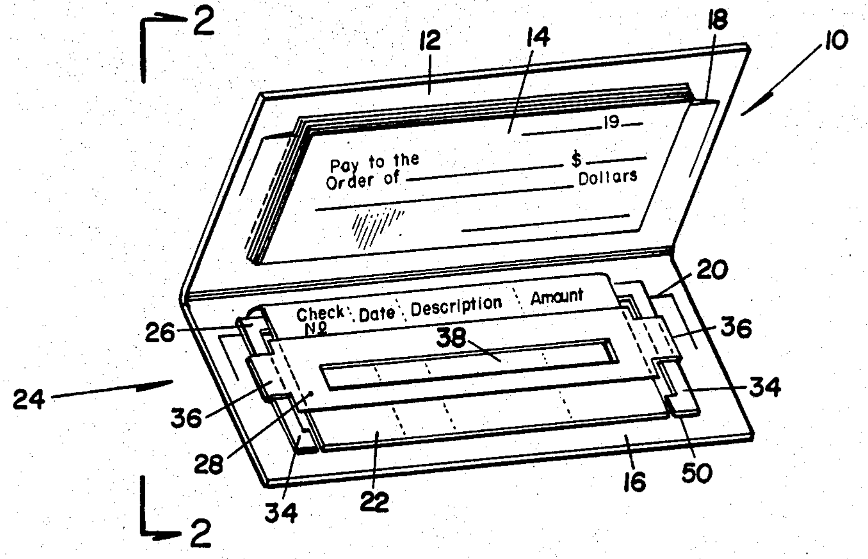
FIG. 1 is a perspective view of a checkbook commonly used by an individual and is one of the preferred embodiments of the present invention.
Figure 2:
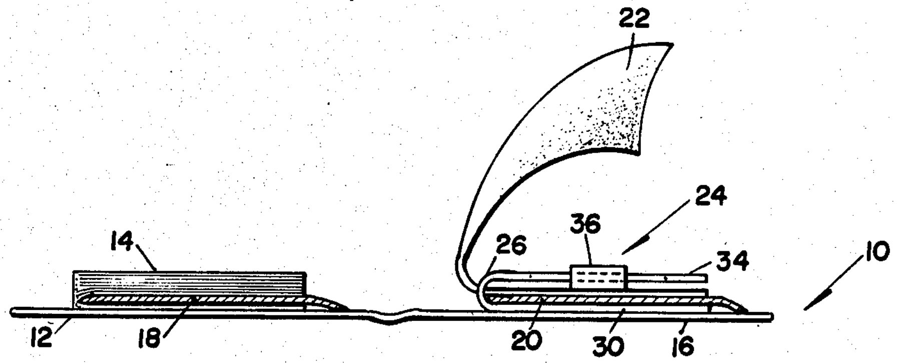
FIG. 2 is a view taken along lines 2—2 of FIG. 1 and shows a preprinted record keeping sheet in phantom.
Figure 3:
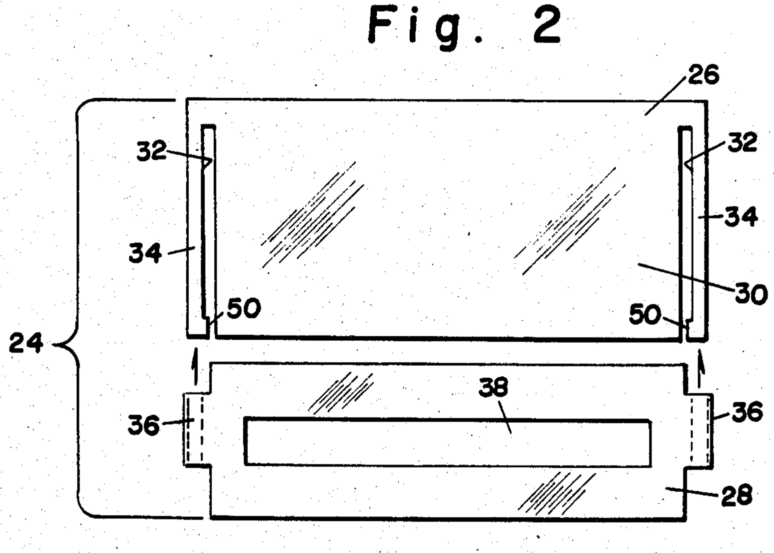
FIG. 3 is a plan view of the sliding mechanism of the present invention prior to its assemblage and insertion into a checkbook.

Referring to the Figures, particularly FIGS. 1, 2 and 3, there is shown a conventional style of pocket checkbook 10, issued by financial institutions for use by those holding checking accounts therewith.

As particularly shown in FIG. 1, checkbook 10 is in the form of a folder which may be made of material, such as leather or vinyl. On the upper portion inside the front cover 12 of the folder is a supply of blank checks 14 in pad form, and on the lower portion inside the back cover 16 of the folder are several preprinted record sheets, (one of which is shown) which are usually in booklet or tablet form comprising a record register, which is a standard item supplied to an individual by the financial institutions. Front cover 12 has an inner pocket 18 for receiving the backing board of the pad of checks 14, and likewise, back cover 16 has an inner pocket 20 for receiving the record register, which shows a single sheet 22 of the register extending out of and laying over pocket 20, more about which is said shortly.

FIG. 2 illustrates the manner in which the record register is inserted and retained in inner pocket 20 (FIG. 1) along with a registering or sliding mechanism 24 of the present invention, where single sheet 22 is shown in phantom to indicate its positioning prior to its placement between registering mechanism 24.

As shown in FIGS. 1 through 3, and particularly in FIG. 3, registering mechanism 24 comprises two templates 26 and 28. Template 26 consists of an intermediate section 30, opposed cut out sections 32 located alongside intermediate section 30, and opposed projections or sliding guides 34. These features and components of template 26 cooperate with each other to act like a clip for its retention in inner pocket 20 in that intermediate section 30 is inserted in inner pocket 20 while sliding guides 34 remain out of and over pocket 20 (FIG. 1). When inserting template 26 into inner pocket 20, the register record is already in inner pocket 20 and template 26 is placed over the register record in pocket 20. Single sheet 22 of the register record is kept out of inner pocket 20, and folded over the portion of template 26 sticking out of inner pocket 20 and made to lay over pocket 20, as particularly shown in FIG. 1. Sliding guides 34, as mentioned earlier, extend out of and over inner pocket 20 alongside single sheet 22 of the record register.

Still referring to FIGS. 1 and 3, there is shown rectangular template 28 which cooperates with template 26, which template 28 is shown to be smaller than template 26, but which if preferred may be substantially the same size as a standard check. Template 28 consists of two opposed hinges of slides 36, which as shown in FIG. 3 are hollow so as to fit over sliding guides 34 of template 26 in order for template 28 to be in a slideable position over single sheet 22 as shown in FIGS. 1 and 2.

Slides 36 are generally in a flat oval disposition relative to sliding guides 34 and are generally made an integral part of template 28. Preferably, both templates 26 and 28 are made of a relatively rigid plastic which is inexpensive and simple to manufacture. As particularly shown in FIGS. 1 and 3, template 28 also consists of an elongated rectangular window 38, which extends a substantial distance across the width of template 28, and when positioned in checkbook 10, window 38 exposes an area of single sheet 22.

On a typical single sheet 22, which is preprinted according to a desireable format, there may be as many as six columns for receiving pertinent data of a transaction. Column 1 is for recording the number of the check; column two for recording the date; column three for recording the name of the payee; column four for recording the amount of the check; column five for recording deposits; and column six for balancing the account. For the purpose of further explaining the present invention, single preprinted sheet 22 is shown to contain an area for entering the name of the payee and the amount of the check across from the payee's name on the same transverse line.

Figure 4:
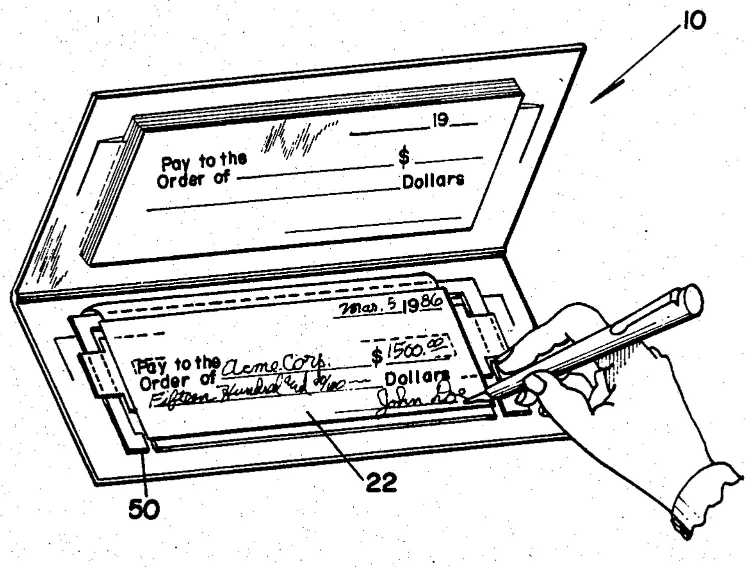
FIG. 4 is a perspective view showing the placement of a check which is to be issued placed over the sliding mechanism of the embodiment of FIG. 1.

In using registering mechanism 24, template 28, through its slides 36 is slid along sliding guides 34 of template 26. Ideally, each preprinted sheet to be inserted between templates 26, 28, as is single sheet 22, of the record register is a pressure sensitive, ink processed paper available on the market. Instead, carbon sheet may be placed under template 28 on top of preprinted sheet 22, whereupon a check is then placed. In using checkbook 10, a check is placed over registering mechanism 24 in a manner that the check is exactly on top of template 28 as shown in FIG. 4. For easy registry of the check over template 28, template 28 may be the same size as a standard check whereupon the area containing the payee's name and the amount of the check is exactly over the window 38 of the template 28.

As particularly shown in FIGS. 1 and 4, the format of a standard check consists of an amount line located to the right, and a line for the name of the payee located to the left of the amount line in the same line relative to each other. Upon placing the check on template 28, the user as shown in FIG. 4, will make certain that the line on the check containing the payee's name and the amount is directly over the window 38 and on top a blank space on single sheet 22. In writing the check, the amount and the payee's name are automatically transferred to the respective columns on single sheet 22. The ability to do this saves valuable time on the individual's part in recording information since it need only be written once. It is also to be appreciated that since this transaction becomes a part of a permanent record, the likelihood of making errors in balancing the account are substantially reduced or eliminated, which errors can lead to the account being overdrawn. If additional information is to be recorded, it can be added separately to single sheet 22 at a later time, or depending on the format of the check and/or the format of each single sheet 22 of the record register, this information can be recorded simultaneously with the issuing of the check.

Figure 5:
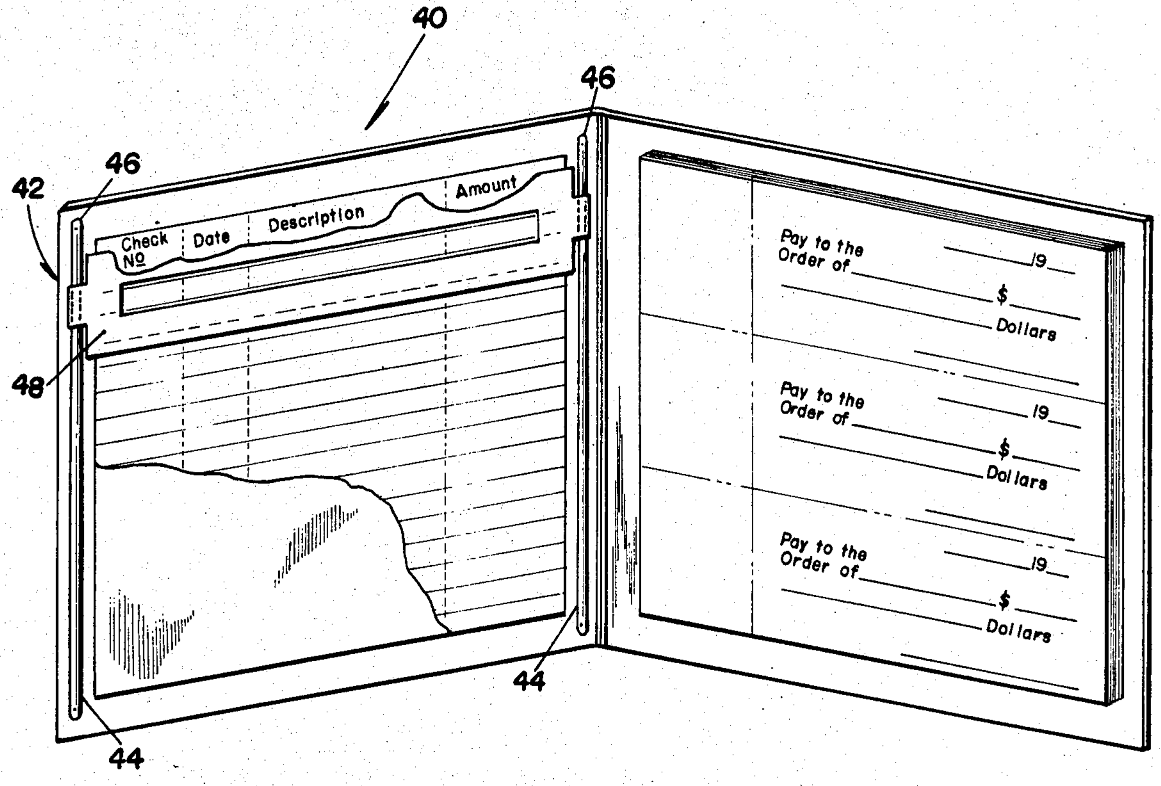
FIG. 5 is a perspective view of the checkbook which may be used by a business, and is another preferred embodiment of the present invention.

FIG. 5 illustrates a second preferred embodiment which may be a type of checkbook 40 used by a business. As shown, the registering mechanism 42 is retained on the left side, while the checks in rows of three and in tablet form are retained on the right side of checkbook 40 in FIG. 5.

In this embodiment of FIG. 5, opposed sliding guides 44 are affixed through suitable means at their upper portions to the inside of the checkbook 40 as shown at 46. Template 48 is similar to template 28 in both its design and function. Even though the guides 44 are two pieces unconnected to each other, a template similar to template 26 of FIGS. 1–4 can also be used; in which case, the intermediate portion of this template may or may not extend the full length of checkbook 40, but be long enough to be adequately retained in the pocket of checkbook 40.

The registering mechanisms 24, 42 of the present invention can cheaply be manufactured and easily supplied together with the checkbook, or they can be supplied as a unit separate from the checkbook.

Referring again to FIG. 3, template 26 has at the bottom of its sliding guides 34, an extended flexible portion 50 which stops the movement of template 28 along sliding guides 34 for the retention of template 28. These portions or stops 50 are flexible enough that guides 36 of template 28 can easily be slid past stops 50 upon the template 28 reaching the bottom portion of the record register i.e. the bottom of the checkbook, or for the removal of template 28 from template 26. These stops 50 are shown to be an integral part of template 26, but can be made to be fixedly attached to guides 34 of template 26, in which case these stops 50 would be mounted on guides 34 after template 28 is assembled to template 26.

As explained above, template 28 may or may not be the same size as a standard check for its proper functioning. Also, the registering mechanisms 24, 42 of the present invention can be used with record keeping devices other than that disclosed herein.

While the present invention has been described in connection with the preferred embodiments thereof, as alluded to above, it should be understood that there may be other embodiments which fall within the scope and spirit of the present invention as described by the following claims.

In accordance with the provisions of the patent statutes, I have explained the principle and operation of my invention and have illustrated and described what I consider to represent the best embodiments thereof.

I claim:

1. A device for automatically transferring a transaction during the issuing of a negotiable instrument, such as a check or the like, to a record keeping ledger, comprising:

a folder with front and back covers, and at least an inner pocket on the inside of said folder, a first template having a portion insertable into said pocket of said folder and opposed legs alongside said insertable portion for extending out of said pocket when said insertable portion thereof is inserted into said pocket, and a second template having window means and cooperating with said first template, said second template having opposed projections each for receiving one of said opposed legs and slideable thereon and over said first template, said first and second templates further arranged to receive pressure sensitive paper means therebetween so that upon said sliding of said second template over said first template, said window means of said second template comes into registry with a selected space on said pressure sensitive paper means, and where, upon the placement of said negotiable instrument directly onto said second template and in the making of said transaction on said negotiable instrument, data from said transaction is transferred through said window means onto said pressure sensitive paper means.

2. A device according to claim 1, wherein said first and said second templates are generally rectangular in shape and said window means of said second template is substantially an elongated, rectangular configuration.

3. A device according to claim 1, wherein said first template further consists of cut-out sections located between said opposed legs and said insertable portion.

4. A device according to claim 1, wherein said second template is substantially the same size as said negotiable instrument for easy registry of said negotiable instrument with said window means of said second template, said window means being correspondingly located relative to an area on said instrument where pertinent data is filled in at the time of said transaction.

5. A device according to claim 1, further comprising:

stop means associated with said opposed legs of said first template constructed and arranged to allow said opposed projections of said second template be positioned and secured on said opposed legs.

6. A device according to claim 5, wherein said stop means is an integral part of said opposed legs of said first template.

7. A device for recording a transaction in the issuing of a negotiable instrument, such as a check or the like, in a record keeping ledger consisting of at least a single sheet of paper for receiving data, comprising:

a folder having front and back covers with at least an inner pocket on the inside of said folder for carrying said record ledger wherein said single sheet is arranged to lay over said inner pocket, opposing guides extending alongside said inner pocket and said single sheet of paper of said record ledger, and a template having window means and opposed projections, each for receiving one of said opposed guides, said opposed projections slideable along said opposed guides so that said window means of said template is placed in registry with a selected area of said single sheet of paper which is either self-marking pressure sensitive or used with a carbon leaf, where, upon the placement of said negotiable instrument onto said template in the issuing of said instrument, the indicia filled in at the time of said transaction is transferred into said selected area of said single sheet of said record keeping ledger.

8. A device according to claim 7, wherein said template is generally rectangular in shape and said window means thereof is in the form of an elongated, rectangular configuration.

9. A device according to claim 7, wherein said template is substantially the same size as said negotiable instrument for easy registry of said instrument with said window means of said template, said window means being correspondingly located relative to an area on said instrument where pertinent data is filled in at the time of said transaction.

10. A device according to claim 7, further comprising:

stop means associated with said opposed guides constructed and arranged to allow said opposed projections of said template to be positioned and secured to said opposed legs.

11. A device according to claim 10, wherein said stop means are an integral part of said opposed guides.

* * * * *